United States Patent
Ni et al.

(10) Patent No.: US 9,682,332 B2
(45) Date of Patent: Jun. 20, 2017

(54) DEVICE FOR INDUCING NUCLEATION

(71) Applicant: HERIOT WATT UNIVERSITY, Edinburgh (GB)

(72) Inventors: Xiongwei Ni, Edinburgh (GB); Craig James Callahan, Falkirk (GB)

(73) Assignee: Heriot Watt University (GB)

( * ) Notice: Subject to any disclaimer, the term of this patent is extended or adjusted under 35 U.S.C. 154(b) by 300 days.

(21) Appl. No.: 14/364,628

(22) PCT Filed: Dec. 12, 2012

(86) PCT No.: PCT/GB2012/053111
§ 371 (c)(1),
(2) Date: Jun. 11, 2014

(87) PCT Pub. No.: WO2013/088145
PCT Pub. Date: Jun. 20, 2013

(65) Prior Publication Data
US 2014/0328731 A1    Nov. 6, 2014

(30) Foreign Application Priority Data

Dec. 13, 2011 (GB) .................................. 1121401.2

(51) Int. Cl.
*B01J 19/02* (2006.01)
*B01D 9/00* (2006.01)
(Continued)

(52) U.S. Cl.
CPC .......... *B01D 9/005* (2013.01); *B01D 9/0036* (2013.01); *B01D 9/0059* (2013.01); *B01J 19/006* (2013.01);
(Continued)

(58) Field of Classification Search
USPC ........................................ 422/245.1; 117/200
See application file for complete search history.

(56) References Cited

U.S. PATENT DOCUMENTS 2,672,487 A    3/1954   Tegge et al.
3,092,673 A *  6/1963   Rush .................... B01D 9/0013
                                                      422/245.1
(Continued)

FOREIGN PATENT DOCUMENTS

EP    0119978 A2    9/1984

OTHER PUBLICATIONS

International Search Report and Written Opinion of related PCT/GB2012/053111.

*Primary Examiner* — Robert M Kunemund
(74) *Attorney, Agent, or Firm* — Benesch, Friedlander, Coplan & Aronoff LLP; Thomas Y. Kendrick (57) ABSTRACT

Described is a device for inducing crystal nucleation in a crystallizer. The device comprises a vessel for fluid and a surface abrader, wherein the surface abrader is configured to abrade a surface within the vessel to induce crystal nucleation. The friction of the abrader against the surface within the vessel creates nano-sized particulates which induce crystal nucleation. Crystal growth can then take place in the crystallizer. Also described is a crystallization apparatus comprising the device and a crystallization process using the device or similar. The device is significantly cheaper and more reliable than known ultrasound devices and facilitates the separation of crystal nucleation and crystal growth. The device also enables the avoidance of the use of seeding as a source of secondary nucleation.

16 Claims, 3 Drawing Sheets

(51) Int. Cl.
*B01J 19/00* (2006.01)
*B01J 19/18* (2006.01)
*B01J 19/24* (2006.01)

(52) U.S. Cl.
CPC ......... *B01J 19/0013* (2013.01); *B01J 19/185* (2013.01); *B01J 19/1812* (2013.01); *B01J 19/242* (2013.01); *B01J 19/243* (2013.01); *B01D 9/0013* (2013.01); *B01D 2009/0086* (2013.01); *B01J 2219/00094* (2013.01); *B01J 2219/00159* (2013.01); *B01J 2219/00765* (2013.01); *B01J 2219/1943* (2013.01)

(56) References Cited

U.S. PATENT DOCUMENTS

| | | | |
|---|---|---|---|
| 4,004,886 A | 1/1977 | Thijssen et al. | |
| 4,588,562 A * | 5/1986 | Saitoh | B01D 9/004 422/245.1 |
| 5,394,706 A | 3/1995 | Keus | |
| 5,558,678 A * | 9/1996 | Weger | B29B 13/021 23/295 R |
| 5,966,966 A | 10/1999 | Botsaris et al. | |
| 6,913,648 B2 * | 7/2005 | Hasegawa | C30B 7/00 117/200 |
| 6,966,947 B2 * | 11/2005 | Furuya | B01D 9/0059 117/68 |
| 7,011,708 B2 * | 3/2006 | Noda | B01D 9/0013 117/200 |
| 2004/0247667 A1 * | 12/2004 | Al-Ghazawi | A61K 9/2009 424/465 |

* cited by examiner

DEVICE FOR INDUCING NUCLEATION

FIELD OF INVENTION

This invention relates to a device for inducing nucleation, a related process and a crystallisation apparatus.

BACKGROUND ART

Crystallization is one of the most widely used separation processes in the chemical and pharmaceutical industries, with some 80% of products going through a crystallisation step at some point in their manufacture.

Crystallisation determines product quality, such as desired morphology and size distribution for subsequent filtering, washing, reaction with other chemicals, transporting, tableting, packaging and storage.

However, despite its importance and significant research efforts, crystallisation remains one of the least well understood and most difficult manufacturing processes to control. For example, at present there is no way to monitor and control primary nucleation.

Primary nucleation can be homogeneous or heterogeneous.

Homogeneous primary nucleation is the initial formation of crystal nuclei where there are no other crystals present at all. Heterogeneous primary nucleation is where impurities that are present induce the formation of crystals either spontaneously or due to a change in environmental conditions (such as a drop in temperature, for example). This is distinct from secondary nucleation where the formation of crystal nuclei is attributable to the presence of existing microscopic crystals, which have been deliberately added, i.e., seeding.

Generally, primary nucleation cannot be monitored or controlled because the size of the nuclei generated is too small and the concentration of the nuclei generated is too low to detect using currently available techniques. Therefore, at present there is no way to separate and independently study the nucleation of crystal nuclei and the growth of crystals. The ability to carry out such studies would be of significant importance as nucleation largely dictates the final characteristics of a crystal.

EP1965900 describes a crystallisation apparatus having independent temperature control in different process zones. However, there is no clear way to separate and/or control nucleation and growth of crystals. Also, it is known to induce nucleation using ultrasound, but such devices are generally very expensive, energy intensive and in some cases unreliable. Using seed crystals ("seeding") is the most common method of inducing nucleation in industrial crystallisation operations, primarily because it can provide the final crystals with the same characteristics as the seed crystals. However, seeding requires a large number of experimental tests to be carried out in order to understand the effect of size, amount and quality of the seeds on the properties of the crystallised product so obtained.

Therefore, it is an object of the invention to overcome at least some of the disadvantages of the prior art.

Further aims and objects of the invention will be apparent from the description herein and the advantages provided by the invention.

DISCLOSURE OF INVENTION

According to a first aspect of the invention there is provided a device for inducing crystal nucleation in a crystalliser and being configured for fluid attachment thereto, the device comprising a vessel for fluid and a surface abrader, wherein the surface abrader is configured to abrade a surface within the vessel to induce crystal nucleation.

The device is a nucleation generator. The device (nucleation generator) is significantly cheaper and more reliable than known ultrasound devices.

To date, it has not been possible to separate crystal nucleation and crystal growth. The generation and control of primary nucleation enables the avoidance of using seeding as a source of secondary nucleation.

Preferably the surface abrader is configured to abrade the inside surface of the vessel.

The friction of the abrader against the surface within the vessel creates nano-sized particulates which induce crystal nucleation. Crystal growth can then take place in the crystalliser.

The device may further comprise a reciprocating actuator, wherein the reciprocating actuator comprises the surface abrader.

The reciprocating actuator may comprise a reciprocating shaft joined to a baffle set.

The reciprocating actuator may be a linear actuator or, alternatively, can be a non-linear actuator.

The reciprocating actuator may be a double ended piston.

The vessel may be a tubular vessel, optionally a substantially cylindrical vessel.

The vessel may comprise an outlet configured for fluid connection to the crystalliser, and optionally an inlet for receiving one or more substances.

Preferably the surface abrader comprises one or more annular baffles having a rim defined by the circumference thereof, wherein the annular baffle is sized and arranged such that the rim contacts the inner surface of the vessel.

The surface abrader may comprise a plurality of annular baffles,

The annular baffles may be arranged in a substantially equidistant manner, optionally substantially in parallel such that they extend radially inwards from the inside surface of the vessel.

The distance between the annular baffles may be between about 1d and 2d where d is diameter of the annular baffle.

Typically the annular baffles are joined together on rails.

The annular baffles can be substantially flat plates comprising an aperture located approximately centrally in said plate.

Typically the baffles have a free area ratio of from about 0.1 to about 0.9, more typically from about 0.1 to about 0.5, most typically from about 0.18 to about 0.25, preferably from about 0.21 to about 0.23, most preferably 0.21.

According to a second aspect of the invention there is provided a crystallisation apparatus comprising at least a first section and a second section in fluid connection, the first section comprising a device for inducing formation of crystal nuclei, and the second section comprising a crystalliser configured to facilitate crystal growth, wherein the device comprises a vessel for fluid and a surface abrader configured to abrade a surface within the vessel to induce crystal nucleation.

The device is a nucleation generator.

To date, it has not been possible to separate crystal nucleation and crystal growth. The generation and control of primary nucleation enables the avoidance of using seeding as a source of secondary nucleation.

The friction of the abrader against the surface within the vessel creates nano-sized particulates which induce crystal nucleation. Crystal growth can then take place in the crystallisation apparatus.

Preferably the crystalliser comprises a vessel for fluid, optionally a tubular vessel, optionally a substantially cylindrical vessel.

The crystalliser may comprise an inlet configured for fluid connection to the device, and optionally an outlet configured for fluid connection to the device.

The crystalliser may comprise an inlet for receiving one or more substances and/or an outlet for discharging one or more substances.

It will be appreciated that the crystalliser, the device, the crystallisation apparatus and the vessels that make up the same are able to receive, hold and discharge various substances such as fluid, liquids, slurries, suspensions and other mixes of phases such as, for example, a solid crystalline product suspended or contained within a supernatant fluid or mother liquor.

Preferably the crystalliser comprises one or more annular baffles, typically the annular baffles in the crystalliser are static.

The crystalliser may comprise a plurality of annular baffles.

The annular baffles may be arranged in a substantially equidistant manner, optionally substantially in parallel such that they extend radially inwards from the inside surface of the vessel.

Typically the distance between the annular baffles is between about 1 d and 2d where d is diameter of the annular baffle.

The annular baffles may be joined together on rails.

Typically the annular baffles are substantially flat plates comprising an aperture located approximately centrally in said plate.

Typically the baffles have a free area ratio of from about 0.1 to about 0.9, more typically from about 0.1 to about 0.5, most typically from about 0.18 to about 0.25, preferably from about 0.21 to about 0.23, most preferably 0.21.

The crystalliser may comprise a series of vessels arranged and operatively connected in a flow system to form at least one continuous fluid flow path, and wherein the device for inducing formation of crystal nuclei is fluidly connected to said fluid flow path.

The apparatus can be used in a continuous, semi-continuous or fed batch process. The device can be placed at the start of or further along the fluid flow path.

The vessels may be configured to follow a succession of return paths in one or more parallel planes. Further return paths can be arranged perpendicular to the parallel planes.

The return paths may define discrete process zones, each process zone comprising a temperature regulator for independently controlling the temperature thereof.

Optionally at least two successive vessels are fluidly connected to each other by a device for inducing formation of crystal nuclei, so forming a return path.

The apparatus may further comprise a flow controller configured to control flow of one or more substances into the apparatus.

The apparatus may further comprise an oscillator configured to impart motion to the contents of the apparatus.

The device may further comprise a reciprocating actuator. The oscillator may be a reciprocating actuator.

The reciprocating actuator may be a linear actuator or, alternatively, can be a non-linear actuator.

The reciprocating actuator may be a double ended piston.

Primary nucleation may take place in the device for inducing formation of crystal nuclei.

Preferably primary nucleation occurs substantially exclusively in the device for inducing formation of crystal nuclei. Typically crystal growth occurs substantially exclusively in the crystalliser.

The device used in the second aspect may be as described in the first aspect.

According to a third aspect of the invention there is provided a crystallisation process comprising the steps of:
i. providing a crystallisation apparatus having a first section and a second section in fluid connection, the first section comprising a device for inducing formation of crystal nuclei, and the second section comprising a crystalliser configured to facilitate crystal growth;
ii. inducing nucleation in the first section; and
iii. growing crystals in the second section.

The device is a nucleation generator.

The nucleation in the first section may be primary nucleation.

The device may comprise a vessel for fluid and a surface abrader configured to abrade a surface within the vessel, wherein inducing nucleation comprises abrading the surface within the vessel with the abrader.

Preferably the abrasion is effected by reciprocation of the surface abrader against the inside surface of the vessel.

Primary nucleation may occur substantially exclusively in the device for inducing formation of crystal nuclei, and the so formed crystal nuclei are transported to the crystalliser.

The crystal growth may occur substantially exclusively in the crystalliser.

The process of the third aspect may be carried out using the apparatus of the second aspect.

Embodiments of the invention will now be described, by way of example only, with reference to the drawings, in which.

BRIEF DESCRIPTION OF THE DRAWINGS

DETAILED DESCRIPTION

Figure 1:
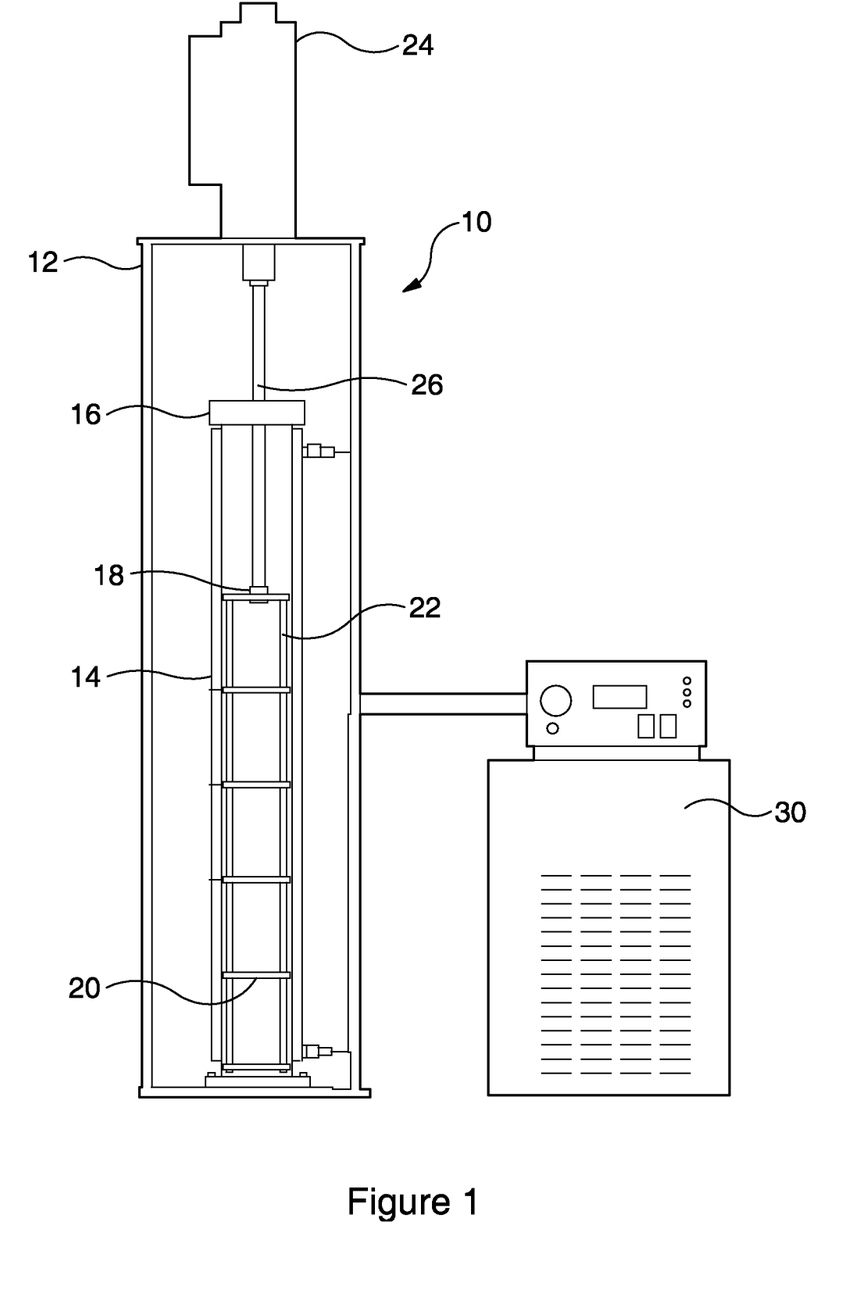
FIG. 1 is a device for inducing nucleation in accordance with one embodiment of the invention.

Referring to FIG. 1, there is shown a nucleation device 10 having a jacket 12 and a glass column (vessel) 14 of internal diameter 50 mm and a height of approximately 500 mm, giving a working volume of 500 mL. The vessel 14 is held in position by a stainless steel flange 16. There is shown a baffle string 18 comprised of four PTFE annular baffles 20 with an outer diameter of 48 mm, an orifice diameter of 24 mm and a thickness of 3 mm. The baffles 20 are spaced equidistantly at 65 mm by stainless steel spacers 22 and are arranged in parallel and such that they extend radially inwards from the sides of the vessel 14. The baffles 20 are oscillated in the vessel 14 by means of a linear motor 24 (Copley Controls Corp.), which was held by an aluminium/plastic frame (not shown). The linear motor 24 has an actuator 26 connected to the baffle set 18, which together act as a linear oscillator or a reciprocating actuator. Frequencies of 0-10 Hz and amplitudes of 0-50 mm are possible in this particular example. Also shown is a temperature controller 30 for controlling the temperature inside the nucleation device 10.

Figure 2:
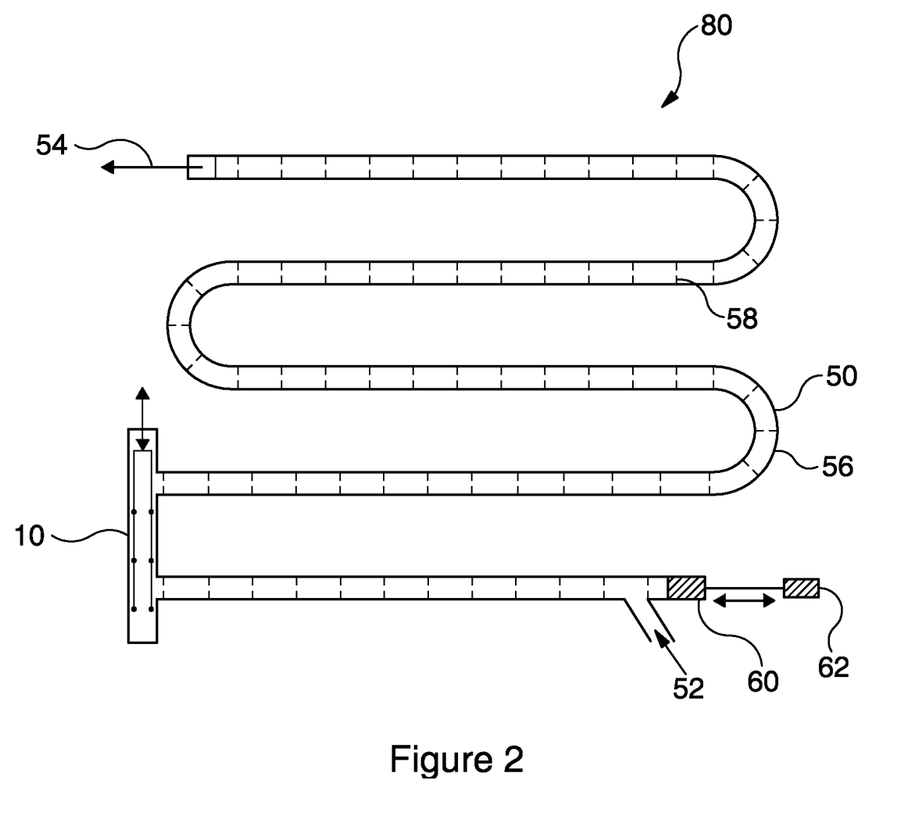
FIG. 2 is a crystallisation apparatus in accordance with one embodiment of the invention.
Figure 3:
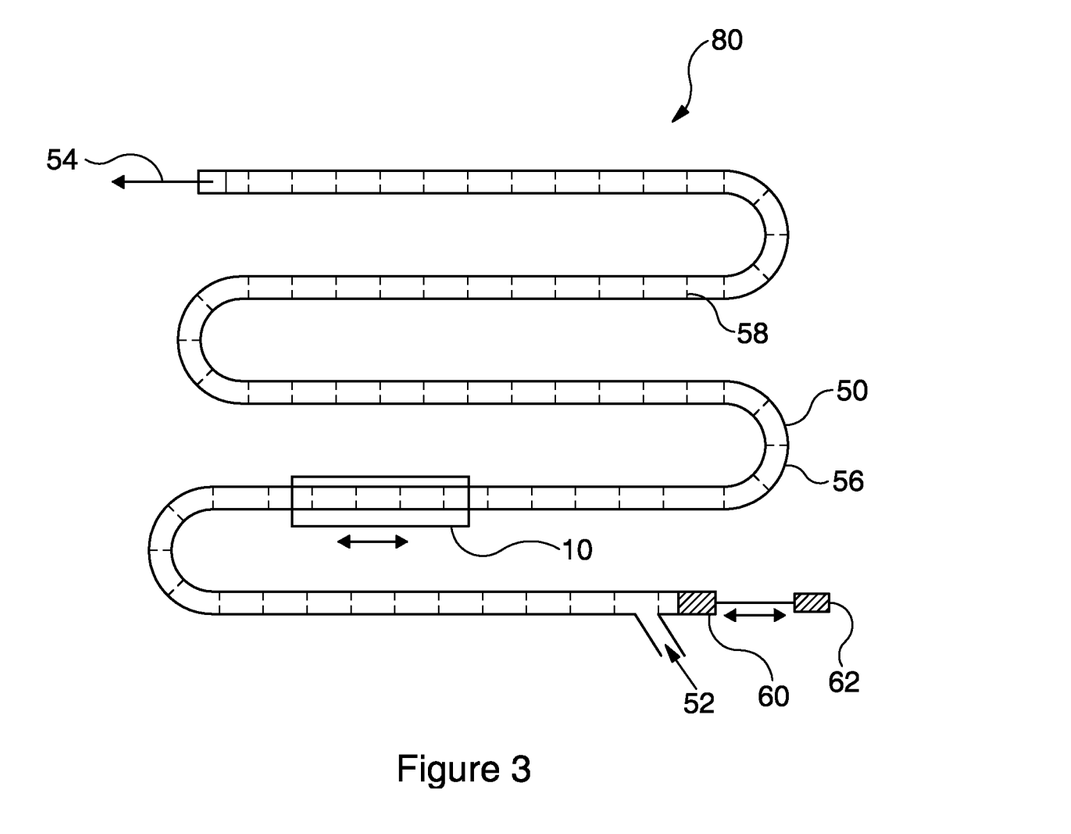
FIG. 3 is a crystallisation apparatus in accordance with an alternative embodiment of the invention.

Turning to FIGS. 2 and 3, there is shown a crystalliser 50 having a nucleation device 10 in fluid connection therewith. The crystalliser 50 and the nucleation device 10 together form a crystallisation apparatus 80. Also shown is an inlet 52 and an outlet 54 which enables the introduction and discharge of substances from the crystalliser 50 or crystallisation apparatus 80. The flow of substances via the inlet can be controlled by a flow controller (not shown).

The crystalliser 50 is formed from a tubular vessel 56 and has a number of annular baffles 58 arranged in parallel on rails (not shown) and spaced equidistantly. Note that the annular baffles are not arranged in parallel where the crystalliser has a U-shaped section. The annular baffles 58 are static. Also shown is an actuator 60 connected to a linear motor 62 and which imparts oscillatory motion to the contents of the vessel 56. This acts as a linear oscillator or a reciprocating actuator.

In FIG. 2, the oscillation of the nucleation device 10 is imparted using an arrangement similar to that shown in FIG. 1.

In FIG. 3, the oscillation of the nucleation device 10 is imparted using a magnetic oscillator (not shown) as is known in the art.

The crystalliser is fluidly attached to the nucleation device by way of an inlet and outlet that connect to the corresponding inlet and outlet of the nucleation device.

In one embodiment the crystalliser has a series of vessels arranged and operatively connected in a flow system to a form a continuous flow path.

The vessels can be arranged to follow a succession of return paths in one or more parallel or perpendicular planes.

In use, a solvated product to be crystallised is provided to the crystallisation apparatus via an inlet and the contents of the crystallisation apparatus are oscillated. The solvated product enters the nucleation device where primary nucleation takes place by way of the oscillating baffle set abrading the inside surface of the vessel. The solvated product with crystal nuclei is then fluidly transferred from the nucleation device to the crystalliser where the solvated product crystallises from solution in a controlled manner. The whole process is carried out in a continuous manner allowing fast processing of substances.

Throughout the whole process intimate mixing is maintained by way of the oscillation and the static baffles. This is important in ensuring consistency in the end product.

Nucleation occurs substantially exclusively in the nucleation device and crystal growth occurs substantially exclusively in the crystalliser.

A temperature control mechanism (regulator) as is known in the art can also be added to give increased control of the crystallisation process. In particular, individual areas of the crystalliser can be process zones, the temperature of which can be independently controlled.

The nucleation device can induce nucleation and can be configured for fluid attachment to a crystalliser (see FIGS. 2 and 3). The baffle set/string and, in particular the rim of the annular baffles, acts as a surface abrader and is sized shaped and configured to abrade a surface within the vessel, more particularly the inside surface of the vessel walls at controlled frequencies and scraping distances. Although described with reference to an oscillating baffle set, it will be appreciated that the abrasion can be carried out using other devices (i.e., abraders or surface abraders) that generate an abrasive or scraping effect such as brushes, rods, sticks, wheels or the like which are of a material, size, shape and are positioned to abrade a surface within the vessel.

The reciprocating actuators described above may be linear actuators such as a solenoid-type arrangement or, where appropriate, can be non-linear actuators such as a rotating motor with a linkage arrangement or, where appropriate, can be a double ended piston arrangement. Non-linear actuators can convert rotational movement into linear movement, whereas linear actuators generally involve only linear movement.

The various vessels described can be tubular or cylindrical and may have inlets and outlets to enable transfer of substances into, out of, or between the vessels (for example, between the nucleation device and the crystalliser).

The baffles described above are annular but can be of an alternative shape that enables efficient mixing to be achieved. Whilst specific spacings are given above, the baffle spacing is typically from 1 d to 2d where d is the diameter of the baffle. The baffles may be joined on rails and can be substantially flat plates comprising an aperture located approximately centrally on the plate.

The free area ratio of the baffle is defined by the area of the orifice (aperture) divided by the total baffle area (or the ratio of the baffle area over the tube across sectional area, i.e. $\alpha=(D_b/D_t)^2$).

In the example given above the baffle free area ratio is 0.21. The baffle free area ratio can be from around 0.1 to about 0.9. In one embodiment the baffle free area ratio is from about 0.1 to about 0.5. In a preferred embodiment the working baffle free area ratio range is typically from about 0.18 to about 0.25. In a particularly advantageous embodiment mixing is achieved using baffle free area ratio of about 0.21 to about 0.23.

The crystallisation apparatus described above has a first section, being the nucleation device, in fluid connection with a second section, being a crystalliser.

Example of Nucleation

An experiment was designed to determine the nucleation mechanism occurring in the nucleation device. This experiment used sodium chlorate, as it exhibits enantiomorphism in the solid state, the morphology of which can provide information on the mechanism of nucleation. Sodium chlorate is a non-chiral substance that on crystallization produces crystalline solids possessing either a left or right handed enantiomorphism. As such, the crystalline solid will display optical activity, a property that can be studied to determine the handedness of the crystals based on the direction of rotation of plane polarized light.

Two relevant investigations into nucleation mechanism were reported in 1972 by Denk and Botsaris (Denk, E. G. and Botsaris G. D., Fundamental studies in secondary nucleation from solution. *J. Cryst. Growth*, 1972. 13/14: p. 493-499; Denk, E. G. and Botsaris G. D., Mechanism of contact nucleation. *J. Cryst. Growth*, 1972. 15: p. 57-60), where at super-cooling of 3° C. and 350 RPM stirring, a crop of product crystals had 100% right handedness when seeded with a single right handed crystal. The same outcome was reported for seeding with a left handed crystal. This indicates that secondary nucleation took place due to either dendrite coarsening or collision breeding within the crystallizer, i.e. the entire product crystals originated directly from the seed crystal. However, the study found that without seeding and also at higher super-cooling (greater than 7° C.), primary nucleation was observed. This was shown from the 50:50 mixture of left and right handed product crystals observed. This indicates that if spontaneous nucleation was occurring, a mixture of both left and right handed crystals would be the evidence.

Therefore, by studying the product crystal handedness it is possible to probe the nucleation mechanism when the hydrodynamic environment is changed. Provided that the process conditions such as super-saturation, temperature and mixing intensity are constants, any changes in product crystals can be attributed to the mixing mechanism.

If seeding with a right handed crystal yields exclusively right handed crystals, then a nucleation mechanism (secondary nucleation from seeding) such as that proposed by Denk and Botsaris can be assumed to have taken place in the nucleation device. If, however, mixtures of both left and right handed crystals are observed, a combination of primary and secondary nucleation can be assumed to have occurred.

The nucleation device was arranged as illustrated in FIG. 1, and was serviced by a water bath and a temperature monitoring tool.

The power dissipation of the nucleation device was estimated using the quasi steady flow model proposed by Baird and Stonestreet (Baird, M. H. I. and Stonestreet P., Energy dissipation in oscillatory flow within a baffled tube. *Chemical engineering research and design*, 1995. 73(5): p. 503-511) using the following parameters: number of baffles per unit length (15.38 m$^{-1}$), discharge coefficient of the baffles (0.7), centre to peak amplitude of oscillation (m, noted below), oscillation frequency (Hz, noted below), and the baffle free area ratio (0.23). The free area ratio is defined by the area of the orifice divided by the total baffle area (or the ratio of the baffle area over the tube across sectional area, i.e. $\alpha=(D_b/D_t)^2$).

Heating and chilling were provided using a Grant GP200R2 heater/chiller and a water jacket. The temperature was monitored by using stainless steel T-Type thermocouples and a four channel temperature display, which was interfaced to a PC to record the temperature profile.

The sodium chlorate used was sourced from Fisher Scientific UK.

Seed crystals were prepared by naturally cooling a quiescent sodium chlorate solution in a 250 mL conical flask using the following procedure. Sodium chlorate and water were mixed in a sealed flask, which was immersed in a water bath at 30° C. Once the material had dissolved, the flask was removed and allowed to cool to room temperature. After leaving the solution overnight, the crystals were extracted by filtration using a Buchner funnel and filter paper (Whatman Grade 1). The crystals were immediately washed with 20 mL of cold water to remove any traces of mother liquor and then dried between filter papers to provide seed crystals.

The handedness of the seed crystals was determined prior to use by polarimetry.

The following trials were carried out using constant process conditions, such as super-saturation, concentration, and cooling, etc. The constants used are outlined in table 1.

TABLE 1

| $T_{SAT}$ (° C.) | C (g NaClO$_3$/100 mL sat. sol.) | Volume (mL) | Dissolution temp. (° C.) | Dissolution time (min) | $\Delta T$ (° C.) | Seed time (min) | No. Of repeats |
|---|---|---|---|---|---|---|---|
| 31 | 73.79 | 500 | 40 | 60 | 1 | 3 | 3 |

The mixing conditions studied are shown in Table 2.

TABLE 2

| f (Hz) | $x_o$ (mm) | P/V (W m$^{-3}$) |
|---|---|---|
| 0.4 | 32 | 11.13 |

Three separate types of experiment were carried out: (i) seeding and agitation; (ii) seeding and no agitation; and (iii) no seeding and agitation.

The general experimental procedure involved weighing out the required amounts of reagent (368.94 g) within the nucleation device and holding the at 40° C. for one hour under the agitation conditions given in Table 2 to ensure that all solid particles had dissolved. After dissolution, the solution was filtered using a Whatman glass fibre filter to remove any foreign particles. The solution was then cooled to the super-saturation point under controlled conditions. Where applicable a single seed crystal of known handedness was washed with cold distilled water before being suspended by means of a wire in the crystallizing solution for three minutes. The wire is prewashed and dried. The seed crystal was then removed from the solution and the agitation stopped to allow the product crystals to grow overnight to form larger crystals.

In the experiments where no agitation was applied, the agitation used for initial dissolution was stopped prior to seeding. For the non-seeded tests, the agitation was stopped and the quiescent solutions held overnight.

Product crystals were collected and quickly washed with 20 mL of cold HPLC grade water and dried on filter paper. Analysis of the crystals was performed using a polarimeter. The left and right handed crystals were then separated and weighed. Each experiment was repeated a further two times in order to determine the margin of error within the data. The apparatus was thoroughly cleaned between trials.

A number of benchmark experiments were also performed where no mixing was applied to nucleation device. This was to illustrate that it is the mixing mechanism that has an effect on the nucleation. The first set of benchmark results are shown in Tables 3 and 4:

TABLE 3

Results for right handed seeds and no mixing

| Trial | Mass Right (g) | Mass Left (g) | Total mass (g) | Similarity to seed (%) |
|---|---|---|---|---|
| 1 | 24.8 | 0 | 24.8 | 100 |
| 2 | 21.2 | 0 | 21.2 | 100 |
| Mean | 23 | 0 | 23 | 100 |
| S.D. | 2.55 | 0 | 2.55 | 0 |

TABLE 4

Results for left handed seeds and no mixing

| Trial | Mass Right (g) | Mass Left (g) | Total mass (g) | Similarity to seed (%) |
|---|---|---|---|---|
| 1 | 0 | 24.2 | 24.2 | 100 |
| 2 | 0 | 22.8 | 22.8 | 100 |
| Mean | 0 | 23.5 | 23.5 | 100 |
| S.D. | 0 | 0.99 | 0.99 | 0 |

When no mixing was applied before, during and after the seeding, it can be seen that all product crystals bore the same handedness as the seed crystal. This indicates that secondary nucleation is the only mechanism in these tests and implies that primary nucleation did not occur. If primary nucleation had occurred, a mixture of left and right handed crystals would have been observed as primary nucleation yields left and right handed product crystals as shown by Denk and Botsaris.

In order to verify that no spontaneous nucleation would occur as a result of surface phenomena, a second set of benchmark experiments were conducted in the same manner as the first set, except no seeding was used. The nucleation device was left overnight and it was found that no crystals were present, thus indicating that the entrainment of foreign particles to initiate heterogeneous primary nucleation was not possible. This also suggests that seeds are necessary to initiate nucleation.

Following on from the benchmark experiments, further experiments were carried out wherein mixing was applied to the two systems. Tables 5 and 6 display the outcomes.

TABLE 5

Results for right handed seeds and mixing

| Trial | Mass Right (g) | Mass Left (g) | Total mass (g) | Similarity to seed (%) |
|---|---|---|---|---|
| 1 | 22.5 | 3 | 25.5 | 88 |
| 2 | 28.2 | 1.4 | 29.6 | 95 |
| 3 | 30.4 | 1.5 | 31.9 | 95 |
| Mean | 27.00 | 1.97 | 29.00 | 92.67 |
| S.D. | 4.08 | 0.90 | 3.24 | 4.04 |

TABLE 6

Results for left handed seeds and mixing

| Trial | Mass Right (g) | Mass Left (g) | Total mass (g) | Similarity to seed (%) |
|---|---|---|---|---|
| 1 | 1.1 | 23 | 24.1 | 95 |
| 2 | 1.4 | 20.5 | 21.9 | 94 |
| 3 | 1.2 | 21.6 | 22.8 | 95 |
| Mean | 1.23 | 21.70 | 22.93 | 94.67 |
| S.D. | 0.15 | 1.25 | 1.11 | 0.58 |

From the results of three trials for each enantiomorph, it is clear that under the conditions studied in this work the nucleation device consistently gave product crystals with 95% similarity to the seed handedness when mixed. Whilst secondary nucleation is still a dominant feature, some sort of primary nucleation must be occurring in order to have the few product crystals with opposite handedness to the seed. This implies a nucleation device creating primary nucleation.

Similar experiments to those outlined above were carried out in a traditional stirred tank crystalliser. The results showed that 100% of the product crystals from the trials bear the same handedness as the seed, irrespective of whether or not there is agitation. Therefore, it would appear that the nucleation mechanism is exclusively secondary for traditional stirred tank crystallisers.

Thus, it can be concluded that the scraping/abrasive effect of the baffles of the nucleation device on the inside wall of the column (vessel) when the baffle string is moving up and down causes primary nucleation. This interaction cause sufficient friction to induce primary nucleation which results in a mixture of left and right handed crystals in the product.

To verify this, a further experiment was designed wherein there is an increased gap between the baffle set and the tube (vessel) ensuring that the scraping/abrasive effect would be eliminated or at least reduced. If the scraping/abrasive effect is causing the primary nucleation, the experiments carried out with this redesigned apparatus should provide 100% of product crystals having the same handedness as the seed crystal.

The results are now shown in Tables 7 and 8.

TABLE 7

Results for right handed seeds and device with increased gap between edge of baffle and inside of vessel wall

| Trial | Mass Right (g) | Mass Left (g) | Total mass (g) | Similarity to seed (%) |
|---|---|---|---|---|
| 1 | 2.49 | 0.01 | 2.50 | 99.6 |
| 2 | 4.39 | 0 | 4.39 | 100 |
| 3 | 4.73 | 0.07 | 4.80 | 98.5 |
| Mean | 3.87 | 0.03 | 3.90 | 99.37 |
| S.D. | 1.21 | 0.04 | 1.23 | 0.78 |

TABLE 8

Results for left handed seeds and device with increased gap between edge of baffle and inside of vessel wall

| Trial | Mass Right (g) | Mass Left (g) | Total mass (g) | Similarity to seed (%) |
|---|---|---|---|---|
| 1 | 0.23 | 3.84 | 4.07 | 94 |
| 2 | 0 | 3.95 | 3.95 | 100 |
| 3 | 0 | 4.15 | 4.15 | 100 |
| Mean | 0.08 | 3.98 | 4.06 | 98.00 |
| S.D. | 0.13 | 0.16 | 0.10 | 3.46 |

From the above data, it can be seen that when gap between the baffle set and the tube (vessel) is increased, the results show a shift in similarity to seed towards the 100% level. This verifies that it is the scraping effect of the baffle set on the inside of the vessel that is the source of the primary nucleation.

The results in tables 3 and 4 show that when seeded with a single crystal of sodium chlorate of known handedness 100% of the same handedness crystal product is obtained without the presence of mixing. However, when agitation is introduced under identical power density and conditions, only around 94-95% of product crystals of the same handedness as the seed are obtained, along with around 5-6% of the opposite handedness crystals (see tables 5 and 6). This means that some kind primary nucleation had taken place within the nucleation device. When the gap between the baffle set and the inside wall of the vessel is increased, closer to 100% of product crystals of the same handedness as the seed are obtained (see tables 7 and 8). This confirms that the scraping/abrasion of the baffles on the inside wall of the vessel is responsible for the primary nucleation.

Traditionally nucleation is induced by adding seeds at specific time of a crystallisation process, the properties of seeds, e.g. size, amount, quality, have significant effects on nucleation and subsequent growth. The example described above shows that the scraping effect of baffle-movement against the wall of the vessel generates primary nucleation events. The invention described above allows this effect to be applied to enable crystallisation to be carried out in a controlled and predictable manner, without the use of seeding. Furthermore, the invention enables crystal nucleation and crystal growth to be separated, providing better control of the process and potentially enabling the processes of nucleation and growth to be studied independently.

Surprisingly, the invention of the present application enables nucleation to take place at a higher temperature and with a narrower metastable zone than in traditional stirred tank crystallisers. It also provides more consistent crystal morphology and rapid crystal growth without the entrainment of impurities, which is normally associated with rapid crystal growth in traditional crystallisers.

The ability to separate crystal nucleation and growth has a profound impact on the science of crystallisation and on the technological applications to which crystallisation is applied. For example, it enables the scientific study and advancement of nucleation theories such as nucleation kinetics. Ultimately, the invention enables the production of predesigned crystals.

In one aspect the invention may be readily applied to existing reactors especially existing baffled reactors, such as oscillatory baffled reactors used for crystallisation.

Various modifications and variations to the described embodiments of the invention will be apparent to those skilled in the art without departing from the scope and spirit of the invention. Although the invention has been described in connection with specific embodiments, it should be understood that the invention as claimed should not be unduly limited to such specific embodiments. Indeed, various modifications of the described modes of carrying out the invention which are obvious to those skilled in the art are intended to be covered by the present invention.

What is claimed is:

1. A crystallization apparatus comprising at least a first section and a second section in fluid connection, the first section comprising a device for inducing formation of crystal nuclei, and the second section comprising a crystallizer configured to facilitate crystal growth, the crystallizer comprising a series of vessels arranged and operatively connected in a flow system to form at least one continuous fluid flow path, and wherein the device for inducing formation of crystal nuclei is fluidly connected to said fluid flow path, and the device comprising a vessel for fluid and a surface abrader configured to abrade a surface within the vessel to induce crystal nucleation, the device further comprising a reciprocating actuator, wherein the reciprocating actuator comprises the surface abrader.

2. The apparatus of claim 1, wherein the crystallizer comprises one or more annular baffles.

3. The apparatus of claim 2, wherein the one or more annular baffles in the crystallizer are static.

4. The apparatus of claim 2, wherein the crystallizer comprises a plurality of annular baffles.

5. The apparatus of claim 2, wherein the one or more annular baffles are arranged in a substantially equidistant manner.

6. The apparatus of claim 2, wherein the one or more annular baffles are arranged substantially in parallel, such that they extend radially inwards from an inside surface of the vessel.

7. The apparatus of claim 2, wherein the distance between the one or more annular baffles is between about 1d and 2d where d is diameter of the annular baffle.

8. The apparatus of claim 2, wherein the one or more annular baffles are substantially flat plates comprising an aperture located approximately centrally in said plate.

9. The apparatus of claim 2, wherein the one or more annular baffles have a free area ratio of from about 0.1 to about 0.9.

10. The apparatus of claim 1, wherein the vessels are configured to follow a succession of return paths in one or more parallel planes.

11. The apparatus of claim 10, wherein at least two successive vessels are fluidly connected to each other by a device for inducing formation of crystal nuclei, so forming a return path.

12. The apparatus of claim 1, wherein the apparatus further comprises a flow controller configured to control flow of one or more substances into the apparatus.

13. The apparatus of claim 1, wherein the apparatus further comprises an oscillator configured to impart motion to contents of the apparatus.

14. The apparatus of claim 1, wherein primary nucleation takes place in the device for inducing formation of crystal nuclei.

15. The apparatus of claim 1, wherein primary nucleation occurs substantially exclusively in the device for inducing formation of crystal nuclei.

16. The apparatus of claim 1, wherein crystal growth occurs substantially exclusively in the crystallizer.

* * * * *